US007697627B1

United States Patent
Griffin

(10) Patent No.: US 7,697,627 B1
(45) Date of Patent: Apr. 13, 2010

(54) FM TRANSMITTER FOR PORTABLE ELECTRONIC DEVICE HAVING ROTARY ENCODER

(75) Inventor: Paul Griffin, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 1031 days.

(21) Appl. No.: 11/348,175

(22) Filed: Feb. 6, 2006

(51) Int. Cl.
*H04L 27/10* (2006.01)
*H04B 1/00* (2006.01)

(52) U.S. Cl. .......................................... 375/272; 455/42
(58) Field of Classification Search ................. 375/272, 375/295, 303; 455/42, 66.1, 99–100, 161.1, 455/164.1, 165.1
See application file for complete search history.

(56) References Cited

U.S. PATENT DOCUMENTS

| 4,267,601 | A | * | 5/1981 | Umeda et al. ............. 455/165.1 |
| 5,936,613 | A | * | 8/1999 | Jaeger et al. ................. 345/172 |
| 5,970,390 | A | * | 10/1999 | Koga et al. ..................... 455/42 |
| 6,240,297 | B1 | | 5/2001 | Jadoul ......................... 455/466 |
| 6,292,440 | B1 | | 9/2001 | Lee ................................. 369/7 |
| 6,396,769 | B1 | | 5/2002 | Polany ........................ 367/131 |
| 6,420,849 | B2 | | 7/2002 | Murphy ....................... 320/114 |
| 6,423,892 | B1 | | 7/2002 | Ramaswamy ................. 84/609 |
| 6,750,445 | B1 | | 6/2004 | Sakai et al. ............... 250/231.1 |
| 6,784,383 | B2 | | 8/2004 | Sugahara et al. .............. 200/11 |
| 6,820,238 | B1 | * | 11/2004 | Auflick et al. ............... 715/723 |
| 6,856,261 | B2 | | 2/2005 | Yoritsune et al. .............. 341/16 |
| 6,898,859 | B2 | | 5/2005 | Taniguchi et al. ................. 33/1 |
| 6,922,899 | B2 | | 8/2005 | Nakamura et al. ............... 33/1 |
| 6,946,649 | B2 | | 9/2005 | Uenaka et al. ........... 250/231.1 |
| 6,972,402 | B2 | | 12/2005 | Ohmura et al. .......... 250/231.1 |
| 6,973,731 | B2 | | 12/2005 | Aikawa et al. ................... 33/1 |
| 7,012,201 | B2 | | 3/2006 | Kodani et al. ................. 200/14 |
| 7,034,282 | B2 | | 4/2006 | Oka et al. ................ 250/231.1 |
| 7,046,176 | B2 | | 5/2006 | Okamuro et al. ............ 341/115 |
| 7,060,916 | B1 | | 6/2006 | Amit ........................... 200/11 |
| 2002/0098813 | A1 | | 7/2002 | Likourezos et al. |
| 2002/0120455 | A1 | * | 8/2002 | Nakata ....................... 704/275 |

\* cited by examiner

*Primary Examiner*—Khanh C Tran
(74) *Attorney, Agent, or Firm*—Hornkohl Intellectual Property Law, PLLC; Jason L. Hornkohl

(57) ABSTRACT

A rotary encoder is used to select a transmission frequency for an FM transmitter associated with a portable electronic device such as a cellular telephone, MP3 player or other portable type electronic device. The rotary encoder is turned in a clockwise or counterclockwise direction to raise or lower the transmission frequency of the FM transmitter. Movement of the rotary encoder is translated into a frequency change on a linear, circular or exponential basis by a microprocessor. The transmission frequency of the FM transmitter is then altered to the selected frequency and the selected frequency is displayed on an LCD screen of the portable electronic device. The rotary encoder may also be used in connection with an accessory for a portable electronic device.

16 Claims, 2 Drawing Sheets

FM TRANSMITTER FOR PORTABLE ELECTRONIC DEVICE HAVING ROTARY ENCODER

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The present invention relates generally to an improvement for a portable electronic device. More particularly, the present invention is directed toward the use of a rotary encoder to control an FM transmitter used with a portable electronic device.

BACKGROUND OF THE INVENTION

Many portable electronic devices such as digital music players, cellular telephones, multimedia players, radios, personal data assistants, etc. are configured to use an FM transmitter to broadcast, or directly transfer through a physical connection, audio to a standard FM radio such that the audio can played over the speakers of the radio. In particular, there are a number of after market accessories designed to be coupled to an existing digital music player to provide the player the ability to broadcast its music to an FM receiver. In order for these systems to work, a user must program the FM transmitter to broadcast its modulated signal over an unused FM frequency. Prior art transmitters typically have buttons or switches that allow the user to select an unused FM frequency. Unfortunately, these buttons and switches are awkward and time consuming to use. Since a FM transmitter may have 100 or more frequencies available for transmission, it is desirable to make the user interface as easy to use as possible. Therefore, what is needed is a more intuitive and user friendly method and device for controlling the FM transmitter of a portable electronic device.

BRIEF SUMMARY OF THE INVENTION

The present invention is directed toward the use of a rotary encoder in connection with an FM transmitter for a portable electronic device such as a digital music player, cellular telephone, multimedia player, radio, personal data assistants, etc. More particularly, an embodiment of the present invention is directed toward an accessory for a portable electronic device, such as an Apple iPod™, that includes an FM transmitter for broadcasting an FM signal received on an input port from the music player to a remote FM receiver. Alternatively, a direct connection such as a cable can be used to transfer the audio signal from the transmitter to the remote FM receiver. A rotary encoder is used to select a broadcast frequency for the FM transmitter. A change in position of the rotary encoder is preferably linearly converted into a change in the selected broadcast frequency. However, a change in position of the rotary encoder may also be exponentially converted into a change in the selected broadcast frequency. In addition, movement of the encoder is preferably circularly translated into a change in frequency such that the selected frequency is altered to the lower frequency limit when the upper frequency limit is exceeded and to the upper frequency limit when the lower frequency limit is exceeded. A display, such as a liquid crystal display, displays the frequency selected by the user of the rotary encoder.

Another embodiment of the present invention is directed toward a digital music player for decoding and playing digital music files. The digital music player includes an FM transmitter for receiving a signal produced by decoding a digital music file, frequency modulating the signal and transmitting the frequency modulated signal to a remote FM receiver. A rotary encoder is used to select a broadcast frequency for the FM transmitter. A change in position of the rotary encoder is linearly, exponentially or circularly converted into a change in the selected broadcast frequency. The rotary encoder is configured to return to a central position after being rotated in either a clockwise or counter clockwise direction. The encoder is also preferably turned from left to right to advance the selected broadcast frequency and from right to left to decrease the selected broadcast frequency. A liquid crystal display displays the frequency selected by a user using the rotary encoder.

Yet another embodiment of the present invention is directed toward a method for selecting a transmission frequency for an FM transmitter that is being used to transmit audio from a portable electronic device to a standard FM receiver. In accordance with the method, a rotary encoder is used to select the transmission frequency and the selected frequency is displayed on a liquid crystal display. A change in position of the rotary encoder is linearly or exponentially converted into a change in the selected transmission frequency. The selected transmission frequency is between a lower frequency limit and an upper frequency limit and the selected frequency is altered to the lower frequency limit when the upper frequency limit is exceeded and to the upper frequency limit when the lower frequency limit is exceeded. The rotary encoder is configured to return to a central position after being rotated in either a clockwise or counter clock wise direction.

DETAILED DESCRIPTION OF THE INVENTION

An embodiment of the present invention is directed toward a rotary encoder interface for an FM transmitter used on portable electronic devices such as digital music players. The rotary encoder allows a user to more easily select the desired station and/or frequency on which to transmit an FM modulated signal from a portable electronic device capable of transmitting on a plurality of frequencies. The transmitting frequency is selected by manipulating a rotary encoder that is attached to a microprocessor. Once the frequency has been selected with the rotary encoder, the current selected station is displayed on the liquid crystal display of the FM transmitter and the FM modulator is set to transmit on the desired frequency indicated by the rotary encoder.

The rotary encoder may be designed such that the turning of the encoder is translated into FM frequencies in either a linear, circular or exponential fashion. When using a linear interface, a user would typically turn the rotary encoder from left to right to advance the frequency number and from right to left to decrease the frequency. With an exponential interface, a microprocessor would determine the appropriate frequency based upon the detected movement of the rotary encoder, display the appropriate frequency on the display screen of the FM transmitter and instruct the FM modulator to transmit at the appropriate frequency. The above discussed encoding schemes are exemplary only and it will be appreciated by those skilled in the art that the microprocessor may use any type of acceleration algorithm to translate movement of the rotary encoder into alteration of the transmit frequency such that when the rotary encoder is turned the frequency will change in a faster manner than it will if a linear conversion is used.

Figure 1:
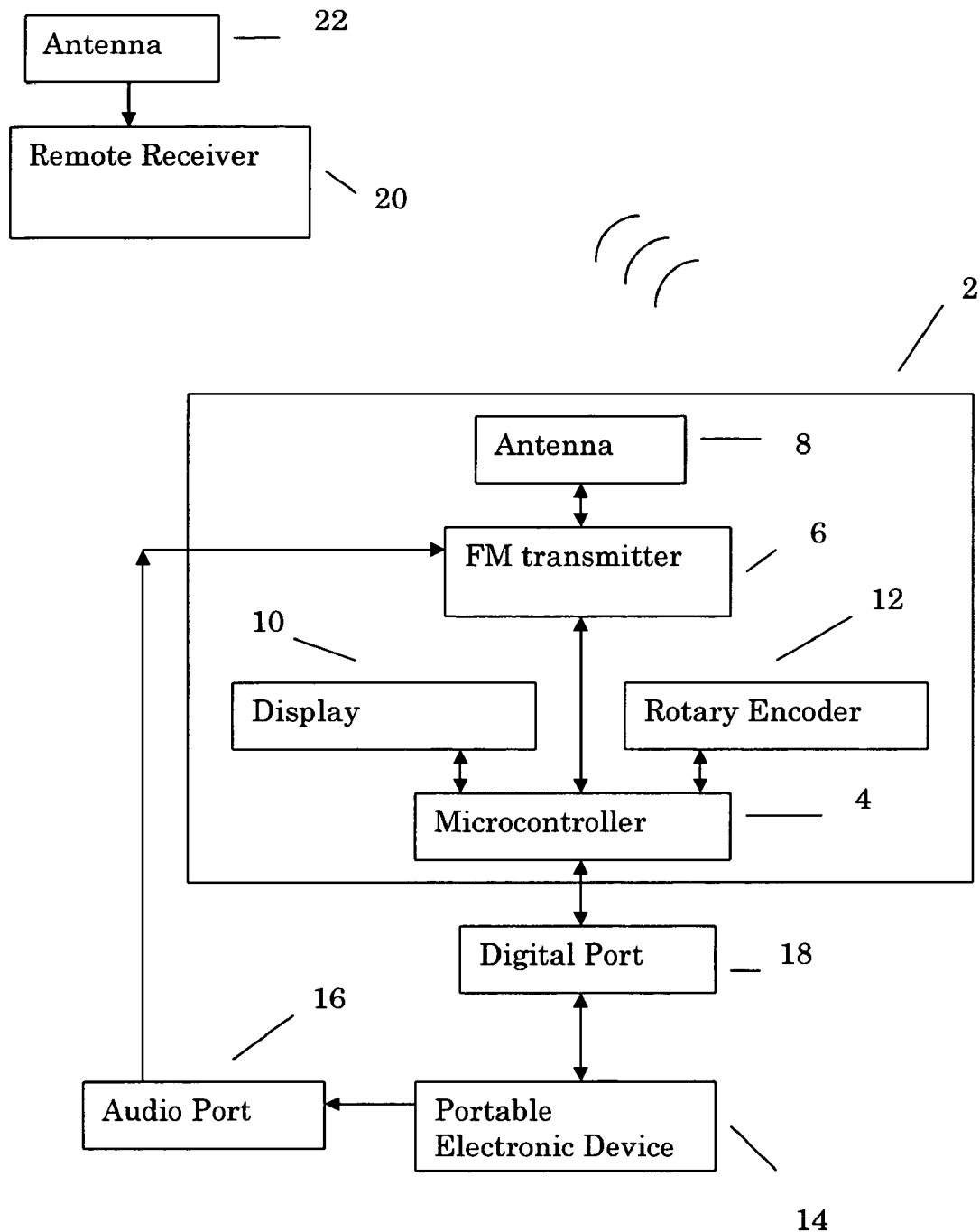
FIG. 1 is a circuit diagram of an accessory for a portable electronic device having an FM transmitter controlled by an rotary encoder.

Referring now to FIG. 1, a block diagram of an accessory for a portable electronic device constructed in accordance with an embodiment of the present invention is shown. The accessory 2 includes a microprocessor 4, an FM transmitter 6, an antenna 8, a display 10 and a rotary encoder 12. The accessory 2 is coupled to the portable electronic device 14 through an audio port 16 and a digital port 18. The audio port 16 transfers an audio signal from the portable electronic device 14 to the FM transmitter 6. The digital port 18 is used to transfer control signals from the accessory 2 to the portable electronic device 14 and vice versa. While an FM transmitter 6 is shown with regard to the embodiment of FIG. 1, it will readily appreciated by those skilled in the art that any other type of transmission scheme, such as an AM transmitter, could be used in accordance with the present invention. The FM transmitter 6 then transmits the frequency modulated signal through an antenna 8 to a remote receiver 20 having an antenna 22, such as a car radio.

The frequency of the FM transmitter 6 is controlled by a microcontroller 4 in the accessory 2 in response to a rotary encoder 12 positioned on the accessory. The current transmission frequency for the FM transmitter 6 is displayed on a display 10 of the accessory 2. The display 10 is preferably a liquid crystal display (LCD) but may be any of the conventional types of displays available. To alter the transmission frequency of the FM transmitter 6, a user manipulates the rotary encoder 12 by turning it to the right or left. For example, in a preferred embodiment, turning the rotary encoder 12 knob to the right increases the transmit frequency while turning the knob to the left decreases the transmit frequency. The microcontroller 4 senses the manipulation of the rotary encoder 12 and translates the detected movement into a transmit frequency alteration. For example, in a preferred embodiment, turning the rotary encoder 12 knob to the right increases the transmit frequency while turning the knob to the left decreases the transmit frequency. As discussed above in more detail above, the manner in which the microcontroller 4 translates movement of the rotary encoder into changes in the transmission frequency of the accessory 2 may be selected to be linear, exponential, etc. as desired. Preferably, the conversion is circular in that once the upper limit of the available frequency range is reached, the transmit frequency is altered to the lower frequency limit, or vice versa, in a circular fashion. The microcontroller 4 then instructs the display 10 to display the newly selected frequency. Alternatively, the microcontroller 4 can instruct a display of the portable electronic device to display the selected frequency through the digital port 18.

The rotary encoder 12 may also be used to control functions of the portable electronic device or accessory. For example, the accessory 2 may be provided with a communication interface that allows it control functions of the portable electronic device 14 in response to manipulation of the rotary encoder 12. The rotary encoder 12 is beneficial when used in this manner due to the fact that its output can be more easily adapted to control a wide variety of functions such as volume control, menu selection and scrolling than the button controls typically associated with an FM transmitter accessory for a portable electronic device.

Figure 2:
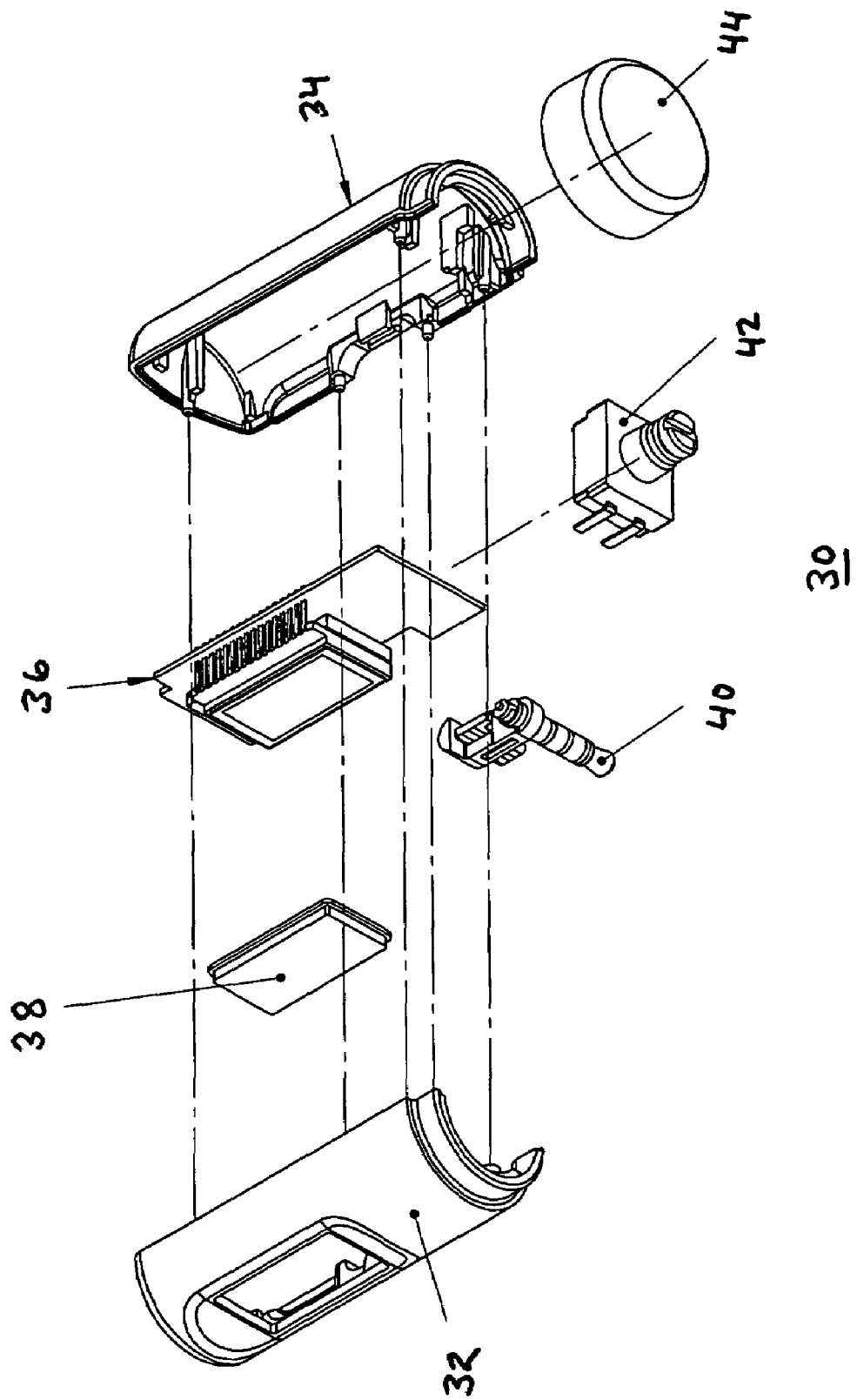
FIG. 2 is an exploded view of an accessory for a portable electronic device having an FM transmitter controlled by a rotary encoder.

Referring now to FIG. 2, an exploded view of a preferred embodiment of an accessory 30 for a portable electronic device having an FM transmitter 36 controlled by a rotary encoder 42 is shown. The accessory 30 is contained in a housing having a front case half 32 and a rear case half 34. The FM transmitter and its associated electronics are contained on a PC board assembly 36. The PC board assembly 36 also contains the display that is viewed through a lens 38 that fits in an opening in the front case half 32. An audio output connector 40 that is designed to receive audio from a portable electronic device such as an MP3 player and provide the audio to the PC board assembly 36 protrudes through the housing 32 and 34. The rotary encoder 42 is coupled to the PC board assembly 36 and protrudes through an opening formed by the housing halves 32 and 34. A knob 44 mates with the rotary encoder 42 and couples to the housing halves 32 and 34 such that the rotary encoder 42 may be turned by turning the knob 44. While the particular design illustrated in FIG. 2 is preferred, it will be appreciated by those skilled in the art that that embodiments of the present invention can take many forms and that the embodiment of FIG. 2 is exemplary only.

Thus, although there have been described particular embodiments of the present invention of a new and useful FM Transmitter for a Portable Electronic Device Having Rotary Encoder, it is not intended that such references be construed as limitations upon the scope of this invention except as set forth in the following claims.

What is claimed is:

1. An accessory for a portable electronic device, said accessory comprising:
   a FM transmitter for broadcasting an FM signal received on an input port from said portable electronic device to a remote receiver;
   a rotary encoder for selecting a broadcast frequency for said FM transmitter; and
   a display for displaying a frequency selected by a user using said rotary encoder;
   wherein said selected broadcast frequency is between a lower frequency limit and an upper frequency limit and wherein said selected frequency is altered to said lower frequency limit when said upper frequency limit is exceeded and to said upper frequency limit when said lower frequency limit is exceeded.

2. The accessory of claim 1 wherein a position of said rotary encoder is linearly converted into a change in said selected broadcast frequency.

3. The accessory of claim 1 wherein a change in position of said rotary encoder is exponentially converted into a change in said selected broadcast frequency.

4. The accessory of claim 1 wherein said portable electronic device is one of a digital music player, a cellular telephone, a personal data assistant or a multi-media player.

5. The accessory of claim 1 wherein said display is a liquid crystal display.

6. A portable electronic device for decoding and playing digital music files, said portable electronic device comprising:
- an FM transmitter for receiving a signal produced by decoding a digital music file, frequency modulating said signal and transmitting said frequency modulated signal to a remote FM receiver;
- a rotary encoder for selecting a broadcast frequency for said FM transmitter; and
- a display for displaying a frequency selected by a user using said rotary encoder;
- wherein said selected broadcast frequency is between a lower frequency limit and an upper frequency limit and wherein said selected frequency is altered to said lower frequency limit when said upper frequency limit is exceeded and to said upper frequency limit when said lower frequency limit is exceeded.

7. The portable electronic device of claim 6 wherein a change in position of said rotary encoder is linearly converted into a change in said selected broadcast frequency.

8. The portable electronic device of claim 6 wherein a change in position of said rotary encoder is exponentially converted into a change in said selected broadcast frequency.

9. The portable electronic device of claim 6 wherein said modulated signal is transmitted to said remote receiver through a physical cable connection.

10. The portable electronic device of claim 6 wherein said rotary encoder is turned from left to right to advance the selected broadcast frequency and from right to left to decrease the selected broadcast frequency.

11. A method for selecting a transmission frequency for an FM transmitter that is being used to transmit music from a portable electronic device to a standard FM receiver, said method comprising the step of using a rotary encoder to select said transmission frequency and displaying said selected frequency wherein said selected frequency is between a lower frequency limit and an upper frequency limit and wherein said selected frequency is altered to said lower frequency limit when said upper frequency limit is exceeded and to said upper frequency limit when said lower frequency limit is exceeded.

12. The method of claim 11 wherein a change in position of said rotary encoder is linearly converted into a change in said selected transmission frequency.

13. The method of claim 11 wherein a change in position of said rotary encoder is exponentially converted into a change in said selected transmission frequency.

14. The method of claim 11 wherein displaying said selected frequency further comprises displaying said selected frequency on a liquid crystal display.

15. The method of claim 11 wherein said rotary encoder is configured to return to a central position after being rotated in either a clockwise or counter clock wise direction.

16. The method of claim 11 wherein said rotary encoder is turned from left to right to advance the selected broadcast frequency and from right to left to decrease the selected broadcast frequency.

\* \* \* \* \*